United States Patent [19]
Magnussen, Jr. et al.

[11] 4,211,486
[45] Jul. 8, 1980

[54] SPECTROPHOTOMETER

[75] Inventors: Haakon T. Magnussen, Jr., Pinole; Roy P. Moeller, Hayward, both of Calif.

[73] Assignee: Altex Scientific, Inc., Berkeley, Calif.

[21] Appl. No.: 888,229

[22] Filed: Mar. 20, 1978

[51] Int. Cl.² .............................. G01J 3/06; G01J 3/42
[52] U.S. Cl. ..................................... 356/328; 356/332; 356/334
[58] Field of Search ........................ 356/315, 319–321, 356/323–326, 330, 328, 332, 334

[56] References Cited
U.S. PATENT DOCUMENTS

| | | | |
|---|---|---|---|
| 2,847,899 | 8/1958 | Walsh | 356/315 |
| 3,695,764 | 10/1972 | Delmas et al. | 356/334 X |
| 3,704,953 | 12/1972 | Carter et al. | 356/332 X |
| 3,868,499 | 2/1975 | Aaronson et al. | 356/326 X |
| 3,917,407 | 11/1975 | Newstead | 356/315 X |

Primary Examiner—F. L. Evans
Attorney, Agent, or Firm—Bielen and Peterson

[57] ABSTRACT

A spectrophotometer utilizing a multiple wavelength electromagnetic wave source which is intercepted and dispersed into a spectrum. The spectrophotometer includes a closed loop servo positioning mechanism for simultaneously directing selected portions of the electromagnetic spectrum to a detector which analyzes these portions of the spectrum for analytical purposes.

25 Claims, 7 Drawing Figures

SPECTROPHOTOMETER

BACKGROUND OF THE INVENTION

The present invention relates to a novel spectrophotometer particularly useful, but not limited to, soluble materials.

Spectrophotometry concerns itself with the measurement of the transmission or reflection of radiant energy by a body in comparison to a standard. Prior spectrophotometers generally fall into two classes: variable wavelength and fixed wavelength types. Fixed wavelength spectrophotometers have good sensitivity but lack the ability to quickly utilize a multiplicity of narrow spectral bands to analyze a sample. Many chemical compounds are transparent to certain bands of electromagnetic spectrum while being absorbent to other bands of the same. Existing variable wavelengths spectrophotometers possess the advantage of using many bands for detection, but require too great a time period to accomplish this task.

A recent innovation in the art of spectrophotometry involves the use of white light being passed through the sample and dispersed into a spectrum. Each element of a linear array of detectors then resolves a narrow portion of the spectrum. The resultant data is processed and provides an accurate depiction of spectral absorbance of the sample being analyzed. However, the linear array is quite expensive and requires passing a high intensity of white light through the sample. The brilliance of the white light tends to adversely effect the solution being analyzed, ie: photo chemical reactions and the like.

Recent art also includes spectrophotometers which utilize oscillating mirrors or gratings to rapidly scan the spectrum through the sample and detector. In such systems, the light transmission at a particular wavelength is derived by sampling the detector output at a precise time during the oscillation, ie: the wavelength measured is related to time. Due to the short sampling time at a particular wavelength the signal to noise ratio from such systems is too low for high performance liquid chromatography use. This system has poor wavelength accuracy and, therefore, exhibits poor reproducibility.

There is a need for a spectrophotometer which is able to quickly employ a plurality of wavelengths of the electromagnetic spectrum to analyze liquid or gas solutions.

SUMMARY OF THE INVENTION

In accordance with the present invention, a novel and useful spectrophotometer is provided. The device of the present invention employs a multiple wavelength electromagnetic wave source in the visible or invisible spectrum. Means for intercepting waves from the source is also employed. Such intercepting means disperses waves from the source into a spectrum.

The portion of the spectrum passes through the gaseous or liquid sample to detection means. The absorptivity of the sample is determined thereby.

The device of the present invention may also comprise directing means to focus the selected portion of the spectrum produced by the intercepting means. The intercepting and directing means may take the form of a prism or grating. Likewise, the intercepting means may be in the form of an interference filter and the directing means may be a mirror prism lens and the like.

The directing means may be mounted on an axis and movable with respect to the same. Such movement may take place substantially about the axis. In the case where the intercepting and directing means are in the form of a grating, such a grating may be curved to provide an image of the source to the defecting means without additional optical elements such as a lens or curved mirror necessary with a flat linearly ruled grating.

Closed loop servo positioning means permits rapid, accurate selection of portions of the spectral radiation being projected through the analysis sample. Such closed-loop servo positioning may include sensor means which discerns the position of the directing means with respect to its axis. The sensor means transforms the directing means position into a signal. A position setting means generates a selected signal which represents the desired position of the directing means with respect to the axis. In this manner, the directing means may be very quickly shifts from one spectral band to another.

The sensor means may use a magnetic, electrical, photometric, and other media to produce its output signal which is conveyed to the comparitor means. For example, the sensor may include an excitor which produces a reference electrical field. An encoder receives the exciter electrical fields at a specified distance therefrom. A shield may be placed between the exciter and encoder to selectively block the electrical field leaving the excitor. The intensity of the electrical field reaching the encoder would be proportional to the axial movement of the directing means. In one embodiment of the present invention, the shield may be linked to the intercepting means as well.

One embodiment provides an encoder having a surface with electricity conductive and electrically nonconductive alternating portions. The shields would correspondingly have a multiplicity of spaces interposed a multiplicity of solid portions blocking the electrical field produced by the exciter. Thus, a slight turning of the shield would greatly alter the electrical field reaching the encoder. Also, the shield would be capable of blocking the entire electrical field emanating from the exciter. The sensor means would be relatively unaffected by movement of the shield and the directing means along the axis of the directing means, ie: away and toward the encoder.

As heretofore described, a prism or grating may serve as the intercepting and directing means. The directing means may include a grating supported by a pair of axially spaced springs. Such springs may take the form of band springs fixed in juxtaposed relationship. The closed loop servo positioning means embraces servo motor means for moving the directing means with respect to the axis. The servo motor means may include a frame wrapped with a conductive material to form a conductive coil thereabout. A shaft could link the frame to the guide. Further, the shield of the servo positioning piece might also be linked to the guide of the directing means such that the servo motor effectively positions the shield in the sensor.

Reference signal means may be incorporated into the encoder by providing a conductive portion thereupon unaffected by the shield. In this manner compensation is provided for variations in the electric field originating from the excitor. A reference capacitor may be substituted to perform this function, also.

It may be apparent that a new and useful spectrophotometer has been described.

It is therefore an object of the present invention to provide a spectrophotometer which rapidly utilizes selected bands of electromagnetic radiation for simultaneous analyses of a sample.

It is another object of the present invention to provide a spectrophotometer which employs a point source of multi-wavelength electromagnetic waves and transforms the same into monochromatic electromagnetic radiation without the aid of lenses or slits.

It is another object of the present invention to provide a spectrophotometer with simplified geometry to minimize contamination of is optical components.

It is yet another object of the present invention to provide a spectrophotometer which may analyze by means of a plurality of bands of electromagnetic radiation and may be controlled by a microprocessor.

It is still another object of the present invention to provide a spectrophotometer utilizing a concave grating for dispersion of the white light into a spectrum and isolating portions of that spectrum to analyze chemical components flowing in a liquid chromatographic system without interrupting the normal flow of the liquid components in that system.

It is another object of the present invention to provide a spectrophotometer which minimizes exposure of the sample to electromagnetic flux and efficiently utilizes an electromagnetic band for analysis.

It is another object of the present invention to provide a spectrophotometer which is relatively inexpensive to manufacture.

It is another object of the present invention to provide a spectrophotometer which may efficiently utilize the ultraviolet region of the electromagnetic spectrum for analysis of liquid chromatographic samples.

The invention possesses other objects and advantages, especially as concerns particular features and characteristics thereof, which will become apparent as the specification continues.

DESCRIPTION OF THE PREFERRED EMBODIMENTS

Figure 1:
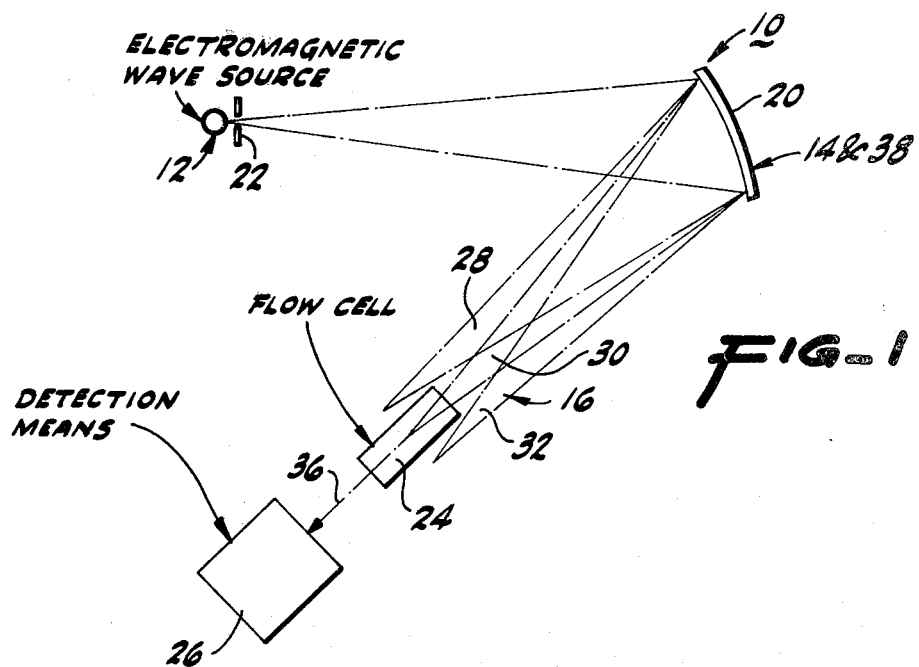
FIG. 1 is a block diagram of the spectrophotometer.

The invention as a whole is shown in the drawings by reference character 10 and includes as one of its elements a multiple wavelength electromagnetic wave source 12, FIG. 1. Source 12 may consist of any relatively broad band lamp. For example, a deuterium lamp may be used to emphasize the ultra-violet region of the electromagnetic spectrum. Likewise, incandescent, xenon, phosphor-mercury vapour and other suitable broad band electromagnetic wave sources may be employed.

The spectrophotometer 10 also includes intercepting means 14 which receives waves emanating from source 12 and disperses the same into a spectrum 16. Intercepting means may take the form of an interference filter, prism, or grating. As shown in FIG. 1, intercepting means 14 is a concave grating 18 having a concave mirrored surface 20 and the necessary closely spaced grating lines thereupon. For example, a model 12H10 Holographic spectrographic grating, manufactured by J. Y. Optical, of Metuchen, New Jersey will serve this purpose. Ideally, source 12 is a point source of electromagnetic waves. In reality, source 12 has a finite dimension and may be projected through a circular opening 22. Flow cell 24 usually includes a circular opening which may be about one (1) millimeter in diameter for admission of the electromagnetic waves from intercepting means 14. Spectrum 16, in the case of a grating, may be the first order type produced thereby. Flow cell 24 would accept a narrow band of spectrum 16 which would then pass through the material being analyzed therewithin. Detection means 26 would record the absorbance of the material being analyzed within flow cell 24.

In accordance with Beer's Law, the absorptive capacity of the material within flow cell 24 is directly proportional to the concentration of the solute in a solution. In addition, Bouguer's law states that each layer of equal thickness of the absorbing medium absorbs an equal fraction of the radiant energy traversing it. The combined laws may be expressed as follows:

$$Log_{10}P_o/P = Log_{10}I/T = A = abc$$

where $P_o$ and $P$ are the radiant power (flux) transmitted by the standard and by the unknown, respectively; $T$ is the transmittance which is equal to $P/P_o$; $A$ is the absorbance; and $a$ is the absorptivity, $b$ the thickness, and $c$ the concentration of solute. The absorptivity $a$ depends on the particular wavelength of electromagnetic radiation being employed for such an analysis. In other words, the fluid solutions being analyzed absorb different amounts of photons from different portions of the electrical magnetic spectrum. Thus, it is important to test for absorbancy at different selected portions of spectrum 16, and to use selected portions of spectrum 16, represented by center wave lengths 28, 30, and 32, in as narrow band width as possible. In this manner, detection means 26 will record well defined absorbancy characteristics which is extremely useful in quantitative and qualitative analysis of a plurality of unknowns within flow cell 24.

It should be noted that detection means 26 may perform the function of referencing transmitted beam 36 to a standard beam. This dual beam technique is well known in the art and may be accomplished therewith.

Spectrophotometer 10 may also include directing means to project spectrum 16 and center wave lengths 28, 30, and 32 toward flow cell 24 and detection means 26. Where intercepting means 14 is a prism or interference filter, directing means 38 might take the form of a lens, mirror, prism, and the like. As shown in FIG. 1, grating assembly 18 serves the functions of intercepting means 14 and directing means 38 without additional optical devices.

Figure 3:
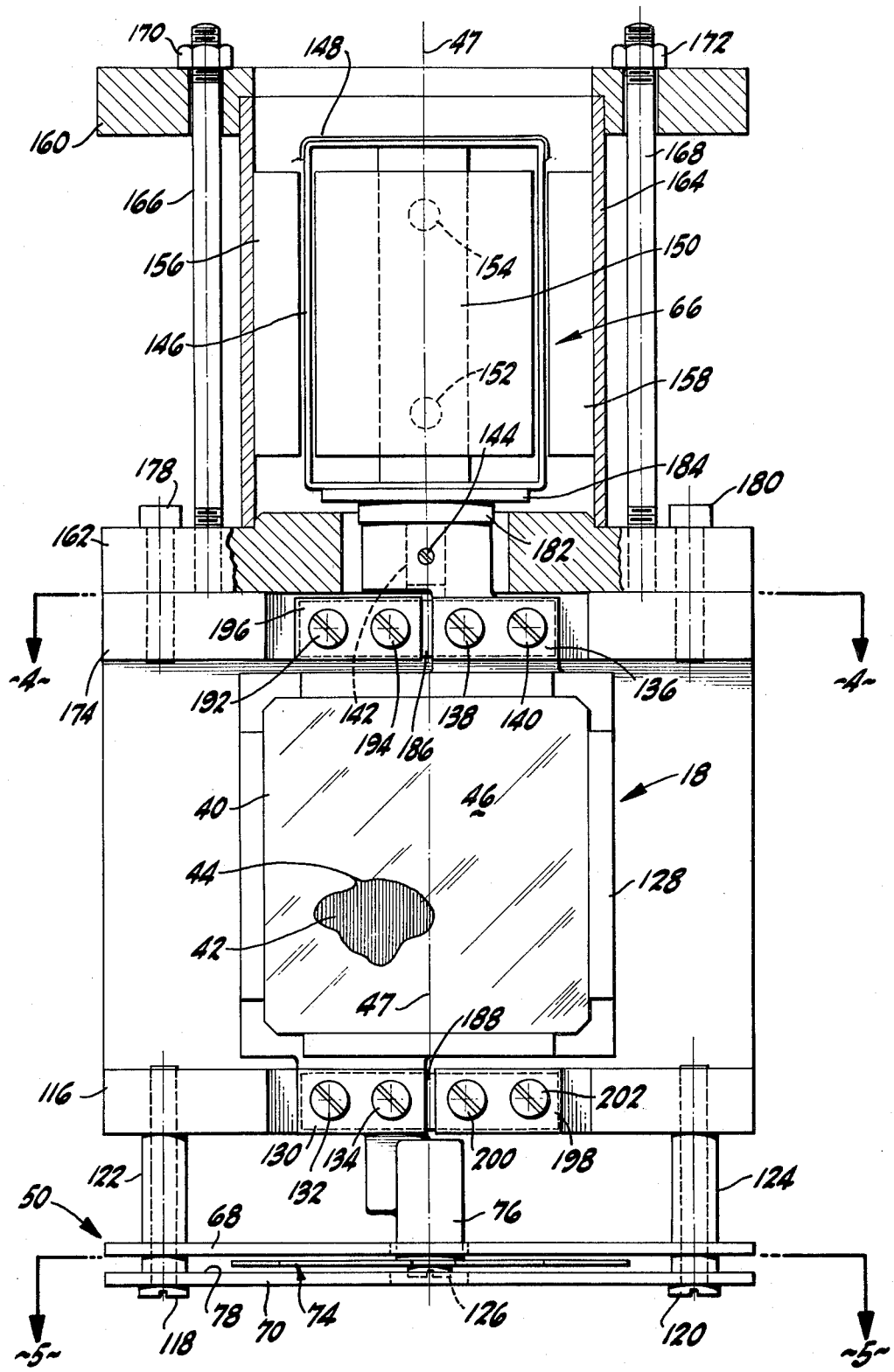
FIG. 3 is a side elevational view, partially in section, of a portion of the spectrophotometer.

Turning to FIG. 3, intercepting and directing means 14 and 38, in the form of grating assembly 18, is shown in the preferred embodiment therewithin. Grating assembly 18 includes a grating 40 which has the necessary grating lines 42 depicted in greatly enlarged portion 44 of grating 40. The surface 46 of grating 40 is slightly concave and has a mirrored finish. Grating 40 moves with respect to axis 47 as will be more fully explained as the specification continues. Grating lines 42 may be ruled on the general order of four thousand to twelve thousand lines per centimeter. Thus, of course, will vary depending on the portion of the electromagnetic spectrum being used for analysis.

Figure 2:
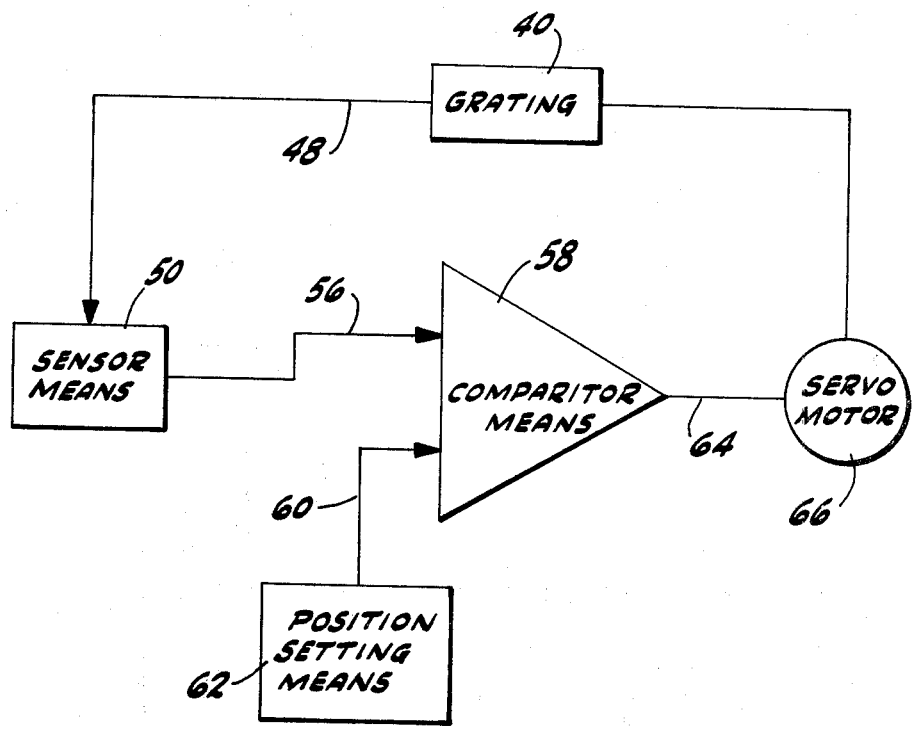
FIG. 2 is a block diagram depicting the closed loop servo positioning means of the spectrophotometer.

The spectrophotometer 10 in one embodiment may include closed loop servo positioning means 48 to move directing means 38, ie: grating 40 of grating assembly 18. FIG. 2 shows in block diagram form the components of such closed loop servo positioning means 48. Sensor means 50 discerns the position of grating 40 about axis 47 and transforms the physical position of grating 40 to a signal 56 representing the same. Comparitor means or error amplifier 58 compares output signal 56 of sensor means 50 and output signal 60 of position setting means 62. An error signal 64 activates servo motor 66 which moves grating 40 until error signal 64 equals zero. Thus, position setting means 62 determines the orientation of grating 40 and the spectral band of spectrum 16 which enters flow cell 24 for spectrophotometric measurement. As shown in FIG. 1, band 30 of spectrum 16 passes through flow cell 24. It has been found that grating 40 of grating assembly 18 turning about 25° of arc will make available the first order spectrum 16 ranging from about 195 nanometers to 700 nanometers. As heretofore stated, different intercepting means 14 may be used to produce a spectrum 16 which includes different portions of the electromagnetic spectrum necessary for analysis of the sample within flow cell 24. The band width of center wavelength 30 actually passing through flow cell 24 would be about 7 nanometers. Further, position setting means 62 may include a microprocessor unit to rapidly change the orientation of grating 40 and the center wavelength 30 of electromagnetic radiation passing through flow cell 24. For example, the spectrophotometer of the present invention may select and encure the absorbance at five distinct center wavelengths of spectrum 16 within a second. Such a feature is critical where the components being analyzed in flow cell 24 are moving at a fixed rate.

Figure 5:
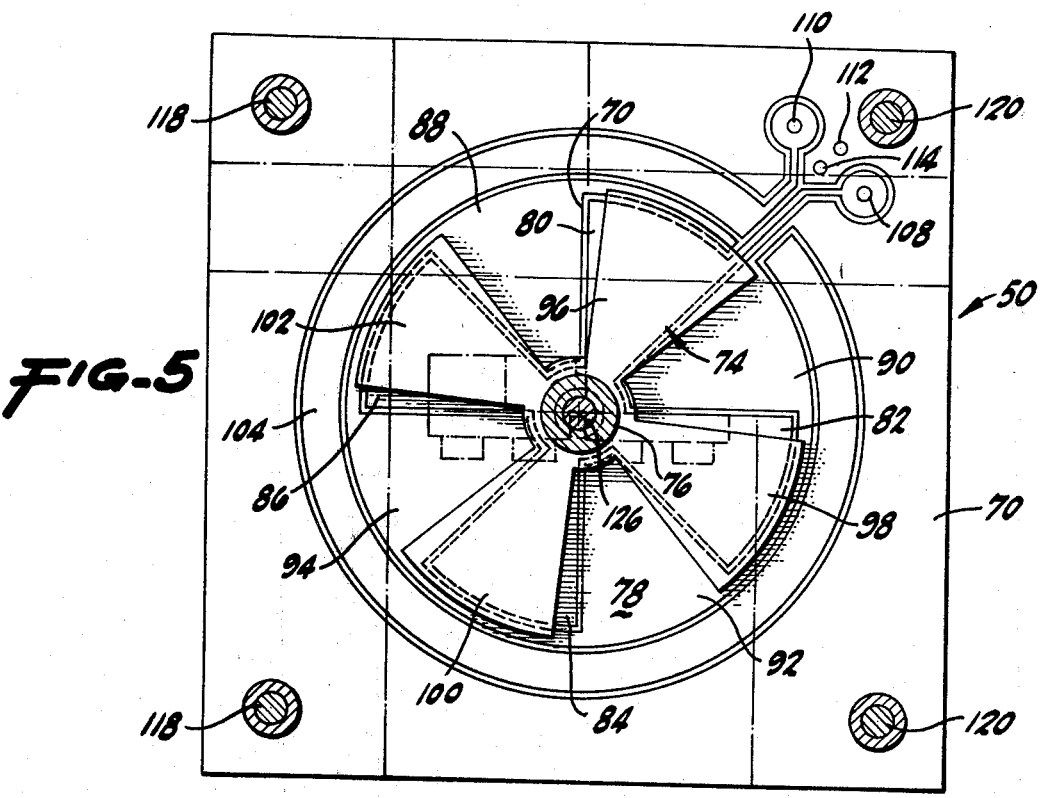
FIG. 5 is a view taken along line 5—5 of FIG. 3.

Sensor means 50 shown in FIGS. 3 and 5, includes in one of its embodiments, an excitor or sensor plate 68 producing a standard signal. As shown in the drawings, such a signal may be an electric field. As encoder or conductive element 70 receives the excitor's signals and transduces the same into an electrical signal 56 which serves as an input to error amplifier 58 (FIG. 2).

Shield 74 mounted on shaft 76 selectively blocks the excitor's signal from excitor 68 to produce an electrical signal of varying strength. With reference to FIG. 5, encoder 70 includes a surface 78 with electrically conductive portions or elements 80, 82, 84, and 86 which alternate with grounded electrically conductive portions 88, 90, 92 and 94. Shield 74 is constructed to have a multiplicity of solid portions 96, 98, 100, and 102 each separated from one another by a space which does not block the electric field from excitor 68. In this manner solid portions 96, 98, 100, and 102 are capable of completely blocking the electric field emanating from the excitor 68. Likewise, a relatively slight movement of shield 74 will permit encoder 70 to receive an electric field from excitor 68. As may be apparent, the greater exposure of conductive portions 80, 82, 84, and 86 to the electric field originating in encoder 68, the greater the strength of the signal 56 will be. Conductive portion 104 which lies on the perimeter of encoder 70, will be more fully explained as the specification continues.

Returning to FIG. 3, it may be apparent that sensor means 50 mounts to plate 116 by the use of mounting screws 118 and 120 and bushings 122 and 124. Mounting screw 126 holds shield 74 to shaft 76. Grating 40 is held within frame 128. The lower portion of frame 128 fixes to block 130 with the use of machine screws 132 and 134. The upper portion of frame 128 fixes to block 136 with machine screws 138 and 140. Block 136 fastens or is integrally connected to shaft 142. Said screw 144 allows the disconnection of shaft 142 from the block 136.

Figure 4:
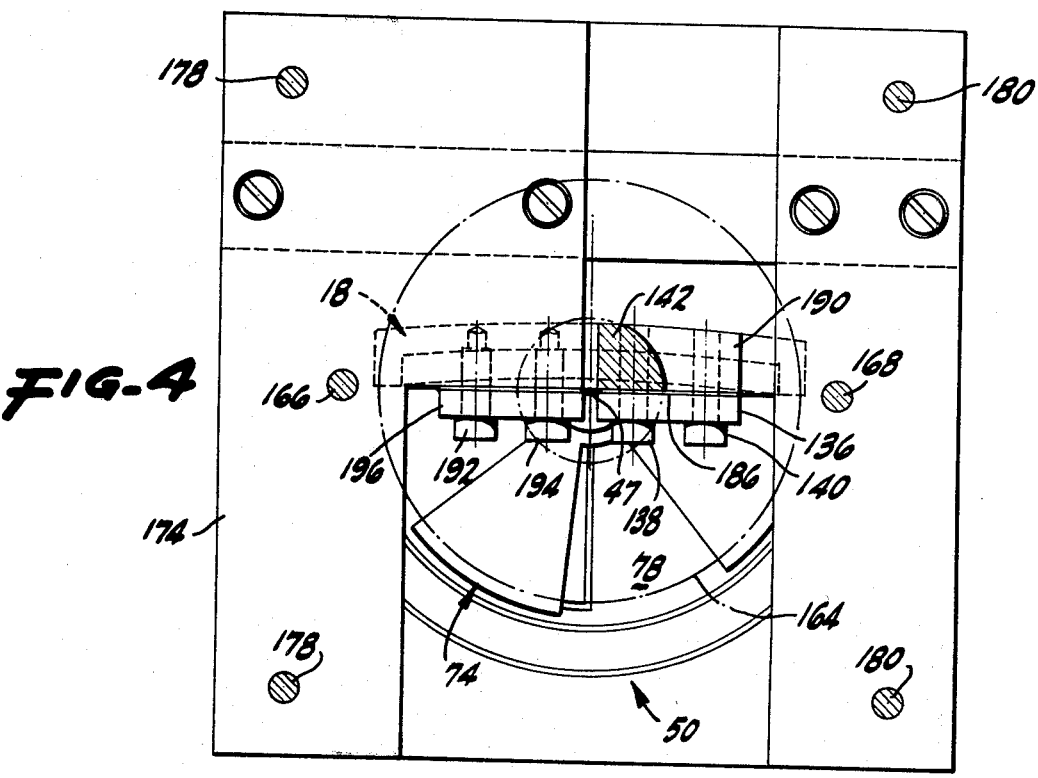
FIG. 4 is a section taken along line 4—4 of FIG. 3.

Servo motor 66 may take the form of a rigid frame 146 constructed, for example, of aluminum. Coils 148 wrap around frame 146. Pole piece 150 is fitted within the coiled frame 146 with screws 152 and 154. Permanent magnets 156 and 158 interact with the magnetic field, a movement inducing signal produced and transmitted by coil frame 146 according to error signal 64. Plates 160 and 162 retain cylindrical member 164 by means of threaded bolts 166 and 168 in conjunction with nuts 170 and 172. Plate 162 fixes to plate 174 with bolts 178 and 180. Coil mounting 182 integrally connects with member 184 affixed to frame 146. Thus, shaft 142 and coil frame 146 impart movement to grating 40 and shield 74. Grating 40 is supported by a pair of band springs 186 and 188 spaced along axis 46. FIG. 4 shows the method of fixation of band spring 186 which, in the embodiment shown, is the same for band spring 188. Machine screws 138 and 140 fix band spring 186 to block 136 and upper portion of frame 128. Thus, blocks 136 and upper portion of frame 128 are movable with the motion of grating 40 and frame 146. Band spring 186 is also fastened with screws 192 and 194 between block 196 and plate 174. Thus, block 196 and band spring 186 sandwiched between block 196 and housing 174 are immobile. Grating 40 of grating assembly 18 turns with respect to axis 46, although such turning deviates slightly from axial rotation. It has been found that such deviation does not affect the accuracy of the projection of band 30 to flow cell 24, since a relatively small turning arc is required to present the entire spectrum 16 to flow cell 24. It should be noted that the lower portion of grating 40 supported by band spring 188 also has a fixed portion fixed by block 198 plate 116, and screws 200 and 202. The portion of band spring held between block 130 and frame 128 is movable. The resultant support of grating 40 of grating assembly 18 has very little friction resistance to turning the same. Thus, grating 40 is quickly positioned at selected places within a very short time span.

Figure 6:
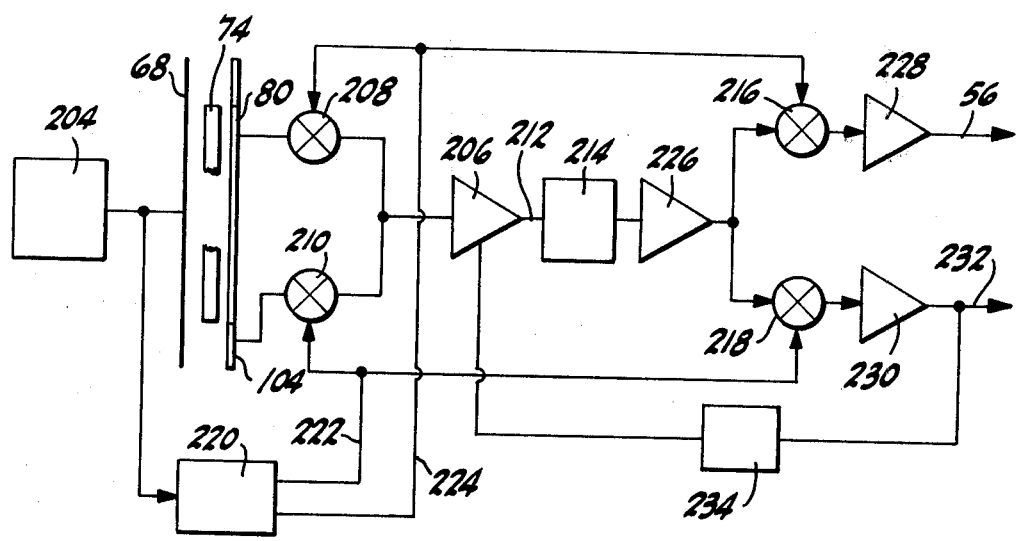
FIG. 6 is a schematic diagram of an embodiment of the invention.

Sensor means 50, FIG. 2, may take a more specific embodiment shown by FIG. 6, where source of sinusoidal voltage such as oscillator 204 feeds into excitor 68. This sinusoidal signal capacitively couples with conductive surface 78 and conductive portion 104 of encoder 70. It should be noted that conductive portion 104 lies outside the shadow of shield 74. The amplitude of the electrical signals from portion 104 is constant while the amplitude of the electrical signals of plate 80 is proportional to the position of shield 74. Terminals 108 and 110 (FIG. 5) conduct the electrical signals from surface 78 and portion 104, respectively. Terminals 112 and 114 reference to ground.

The signals from conductive portion 104 and conductive surface 78 alternatively feed into A.C. amplifier 206 by activation of switches 208 and 210. Output signal 212 from A.C. amplifier 206 is rectified and amplified by detector 214. The output signal of detector 214 travels to switches 216 and 218 which operate in synchronism with switches 208 and 210; switches 208 and 216 turn on and off together, as do switches 210 and 218. Frequency divider 220 provides the complementary signals 222 and 224 that perform the synchronistic operation of switches 208, 210, 216, and 218. By this expedient it may be surmised that the magnitude of the signal at sensor plate 80 controls the magnitude of position signal 56. D.C. amplifiers 226, 228, and 230 amplify the signals coming from detector 214, switch 216, and switch 218 respectively.

FIG. 6 also depicts a reference signal 232 which may be fed into position setting means 62 to compensate for drift therewithin. Such correction is well known in the art. Automatic gain control 234 functions to stabilize the reference signal 232 by adjusting the gain of A.C. amplifier 206. As such the need for reference signal 232 is greatly diminished.

Figure 7:
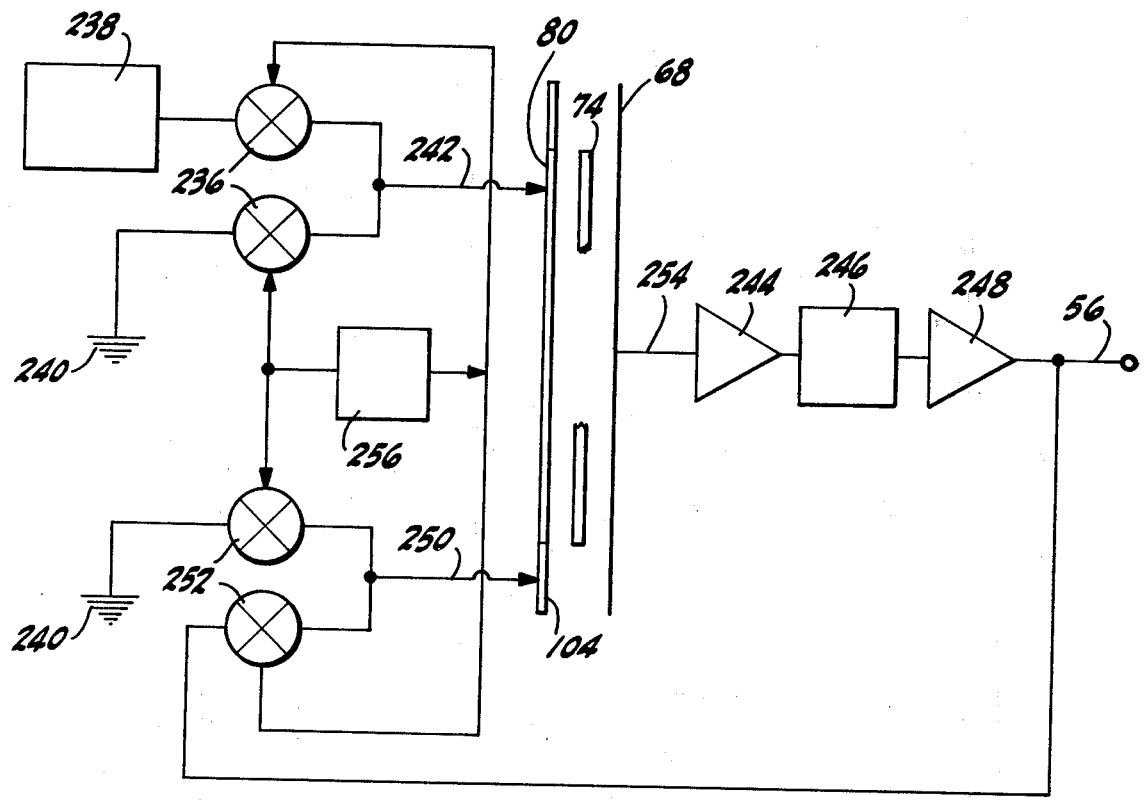
FIG. 7 is a schematic diagram of an embodiment of the invention.

Turning to FIG. 7, yet another embodiment of sensor 50 is shown which uses the same mechanical assembly of the FIG. 6 embodiment, however, these mechanical components are utilized electrically in a different manner.

For instance, conductive portion 80 of conductive element 70 connects to a source of A.C. voltage via terminal 108, FIG. 5. This voltage originates from the action of electronic switch means 236 which rapidly alternatively contacts reference voltage 238 and ground 240. The resulting signal 242 travels to conductive portion 80 of element 70 and, the output therefrom. A second signal 250 is produced by switch means 252, similar to switch means 236, except that signal 250 is of opposite polarity to signal 242. Thus, signal 56, the generation of which will be hereinafter described as the input to switch means 252, is opposite in polarity to signal 242. Thus, signal 56, the generation of which will be hereinafter described as the input to switch means 252, is opposite in polarity to signal 242. Switch control means 256 rapidly switches switch means 236 and 252 between ground and their respective D.C. voltage sources to generate signals 250 and 242. Signal 254 is produced by summing the transmitted portions of signals 242 and 250 on plate 68. The transmitted portion of 242 to plate 68 is proportional to the angular position of rotating shield 74. Signal 254 becomes signal 56 after being amplified and rectified by A.C. amplifier 244, detector 246 and D.C. amplifier 248. Thus, the magnitude of signal 56 to switch means 252 serves as a negative feedback or null signal and is proportional to the position of shield 74, and, therefore, grating 40.

In operation, the user determines by position setting means 62 the proper position of grating 40 of grating assembly 18. Error amplifier 58 will produce an error signal which will move servo motor 66 by the heretofore explained closed loop servo positioning means 48. Frame 146 will turn shaft 142 and orient grating 40 of grating assembly 18 at the same time. Sensor 50 will produce an output signal 56 to error amplifier 58. The output signal 56 of sensor 50 will match the output 60 of the position setting means 62 such that error signal 64 from error amplifier 58 will hold servo motor 66 at the desired position. At this point, a selected center wavelength 30 of spectrum 16 will pass through flow cell 24 and can be detected and compared to a reference signal in detection means 26. Position setting means may program a series of selected center wavelength of spectrum 16 within a short time period for the purpose of analysis.

While in the foregoing specification embodiments of the invention have been set forth in considerable detail for the purposes of making a complete disclosure of the invention, it will be apparent to those of ordinary skill in the art that numerous changes may be made in such details without departing from the spirit and principals of the invention.

What is claimed is:

1. A spectrophotometer comprising:
   a. a multiple wavelength electromagnetic wave source;
   b. means for intercepting waves from said source and dispersing said waves into a spectrum of said electromagnetic waves;
   c. means for detecting a selected portion of said spectrum of said electromagnetic waves;
   d. means for directing a selected portion of the spectrum of said electromagnetic waves to said detecting means;
   e. closed loop servo positioning means for moving said directing means and selected portions of the spectrum of said electromagnetic waves simultaneously to said detecting means, said closed loop servo positioning means including sensor means for discerning the position of said directing means and transforming said position of said directing means into a signal;
   f. position setting means for generating a selected signal representing a desired position of said directing means;
   g. comparitor means for comparing as input signals, said sensor means signal and said position setting means signal, said comparitor means producing an output error signal therefrom; and
   h. servo motor means for moving said directing means comprising means for transforming said error signal into a movement inducing signal, means for transmitting said movement inducing signal, and means for imparting movement to said directing means in accordance with said transmitted movement inducing signal.

2. The spectrophotometer of claim 1 in which said directing means is substantially movable with respect to an axis and said closed loop servo positioning means moves said directing means with respect to the axis.

3. The spectrophotometer of claim 2 in which said wave intercepting means and said directing means comprises a grating.

4. The spectrophotometer of claim 3 in which said grating includes a concave mirrored surface for intercepting and dispersing waves from said wave source and for directing said dispersed waves to said detecting means.

5. The spectrophotometer of claim 4 which additionally includes a flow cell placed between said directing means and said detecting means such that said detecting means receives said selected portion of said spectrum of said electromagnetic waves.

6. The spectrophotometer of claim 1 in which said wave intercepting means comprises a prism.

7. The spectrophotometer of claim 1 in which said wave intercepting means comprises at least one filter.

8. The spectrophotometer of claim 2 in which said directing means includes a grating supported by a pair of axially spaced springs and in which said servo motor means moves said directing means with respect to said axis, said means for imparting movement to said directing means in accordance with said transmitted movement inducing signal comprising a frame having a conductive coil and a shaft linked to said frame and said grating.

9. The spectrophotometer of claim 8 in which said sensor means discerns the position of said grating with respect to said axis and transforms the position of said grating into a signal.

10. The spectrophotometer of claim 9 in which said sensor means comprises:
   a. an excitor producing a signal;
   b. an encoder adapted for receiving said excitor signal and transducing the same into another signal;
   c. a shield adapted for selectively blocking said excitor signal received by said encoder in accordance with the movement of said directing means with respect to said axis.

11. The spectrophotometer of claim 10 in which said shield is linked to said grating for movement therewith.

12. The spectrophotometer of claim 11 in which said encoder includes a surface having electrically conductive and electrically non-conductive alternating portions and said shield includes a multiplicity of solid portions, said solid portions being generally geometrically coincident with said electrically conductive portions of said encoder surface.

13. The spectrophotometer of claim 12 in which said encoder also comprises a conductive portion receiving said excitor signal said encoder being unaffected by said blocking of said shield.

14. The spectrophotometer in claim 2 in which said sensor means comprises:
   a. an exciter producing a sinosoidal signal;
   b. an encoder adapted for receiving said sinosoidal signal and transducing the same into another signal;
   c. a shield adapted for selectively blocking said excitor sinosoidal signal received by said encoder in accordance with the movement of said directing means with respect to said axis;
   d. reference signal means for providing a reference signal received by said encoder from said exciter unblocked by said shield;
   e. switch means for synchronously transmitting said reference signal and said another signal selectively blocked by said shield.

15. The spectrophotometer of claim 14 in which said sensor means additionally comprises automatic gain control means for preventing drift in said position setting means.

16. The spectrophotometer of claim 2 in which said sensor means comprises:
   a. conductive element producing a signal;
   b. a shield adapted for selectively blocking said element signal in accordance with the movement of said directing means with respect to said axis;
   c. sensor plate adapted for receiving said element signal selectively blocked by said sheild;
   d. null circuit means for producing a signal of opposite polarity to said element signal.

17. A method of analyzing a sample comprising the steps of:
   a. a producing a multiple wavelength source;
   b. intercepting waves from said source;
   c. dispersing said waves into a spectrum of said waves;
   d. simultaneously directing a selected portion of the spectrum to a sample and then to detecting means by closed loop servo positioning means utilizing the steps of:
   sensing the position of said directing means;
   transforming said position of said directing means into a signal;
   generating a selected signal representing a desired position of said directing means;
   comparing said signal derived from sensing the position of said directing means and said selected signal representing a desired position of said directing means and producing an output error signal as a result of said comparing;
   transforming said error signal into a movement inducing signal;
   transmitting said movement inducing signal;
   imparting movement to said directing means in accordance with said transmitted movement inducing signal.

18. The method of analyzing a sample of claim 17 in which said step of dispersing said waves include dispersing said waves into a spectrum with a grating.

19. A spectrophotometer comprising:
   a. a multiple wavelength electromagnetic wave source;
   b. means for intercepting waves from said source and dispersing said waves into a spectrum of said electromagnetic waves;
   c. means for detecting a selected portion of said spectrum of said electromagnetic waves;
   d. means for directing a selected portion of the spectrum of said electromagnetic waves to said detecting means;
   e. closed loop servo positioning means for moving said directing means and selected portions of the spectrum of said electromagnetic waves simultaneously to said detecting means;
   f. said closed loop servo positioning means including sensor means for discerning the position of said directing means and transforming said position of said directing means into a signal comprising:
   an excitor producing a signal;
   an encoder adapted for receiving said excitor signal and transducing the same into another signal
   a shield adapted for selectively blocking at least a portion of said excitor signal received by said encoder in accordance with the movement of said directing means.

20. The spectrophotometer of claim 19 in which said encoder includes a surface having electrically conductive and electrically grounded conductive alternating portions and said shield includes a multiplicity of solid portions, said solid portions being generally geometrically coincident with said electrically conductive portions of said encoder surface.

21. The spectrophotometer of claim 20 in which said encoder also comprises a conductive portion receiving said excitor signal said encoder being unaffected by said blocking of said shield.

22. The spectrophotometer of claim 19 in which said encoder includes a surface having electrically conductive and electrically non-conductive alternating portions and said shield includes a multiplicity of solid portions, said solid portions being generally geometrically coincident with said electrically conductive portions of said encoder surface.

23. The spectrophotometer of claim 22 in which said encoder also comprises a conductive portion receiving said excitor signal, said encoder being unaffected by said blocking of said shield.

24. The spectrophotometer of claim 19 in which said shield is linked to said directing means for movement therewith.

25. A spectrophotometer comprising:
 a. a multiple wavelength electromagnetic wave source;
 b. means for intercepting waves from said source and dispersing said waves into a spectrum of said electromagnetic waves;
 c. means for detecting a selected portion of said spectrum of said electromagnetic waves;
 d. means for directing a selected portion of the spectrum of said electromagnetic waves to said detecting means, said directing means movable with respect to an axis, and supported by a pair of axially spaced springs;
 e. closed loop servo positioning means for moving said directing means and selected portions of the spectrum of said electromagnetic waves simultaneously to said detecting means.

* * * * *